United States Patent [19]

Runyan

[11] 4,257,575
[45] Mar. 24, 1981

[54] ROTARY BALL VALVE HAVING SEATING RINGS

[75] Inventor: Gary L. Runyan, Louisville, Ky.

[73] Assignee: Celanese Corporation, New York, N.Y.

[21] Appl. No.: 950,550

[22] Filed: Oct. 12, 1978

[51] Int. Cl.³ .............................................. F16K 31/00
[52] U.S. Cl. ..................................... 251/292; 251/315; 251/309; 403/248
[58] Field of Search ................... 403/248, 249, 252; 251/292, 304, 305, 306, 307, 308, 309, 310, 311, 312, 313, 314, 315, 316, 317, 291

[56] References Cited

U.S. PATENT DOCUMENTS

| | | | |
|---|---|---|---|
| 2,021,490 | 11/1935 | Rigandi | 403/248 |
| 2,333,789 | 11/1943 | Howard | 403/248 |
| 3,131,906 | 5/1964 | King | 251/315 |
| 3,202,175 | 8/1965 | Dumm | 251/315 |
| 3,271,845 | 9/1966 | Breher | 251/315 |
| 3,341,261 | 9/1967 | Fenlin | 403/249 |
| 3,503,586 | 3/1970 | Bordes | 251/291 |
| 3,807,692 | 4/1974 | Usab et al. | 251/315 |
| 3,907,959 | 9/1975 | Wise et al. | 264/242 |
| 3,961,770 | 6/1976 | Wrasman | 251/315 |
| 4,023,773 | 5/1977 | Wise | 251/315 |
| 4,038,358 | 7/1977 | Wrasman | 251/315 |
| 4,042,307 | 8/1977 | Jarvis | 403/248 |

FOREIGN PATENT DOCUMENTS 1031054 6/1953 France ................................... 251/292

*Primary Examiner*—William R. Cline
*Assistant Examiner*—H. Jay Spiegel
*Attorney, Agent, or Firm*—J. A. Shedden; M. Bressler; T. J. Morgan

[57] ABSTRACT

A rotary ball valve comprises a housing formed of plastic material, the housing including a through passage. A plug formed of a plastic material is rotatably mounted in the housing and includes a ball-shaped gate having a passage which is alignable with the housing passage when the plug is open. A stem projects laterally of the housing passage to enable the plug to be manually rotated. A pair of seating rings formed of an anti-friction material encircle respective ends of the gate passage when the plug is open. The housing includes a pair of annular flanges disposed on opposite sides of the plug passage. Each flange contacts a back side of a respective one of the seating rings. Each flange is notched around its periphery to form a plurality of circumferentially spaced flange segments whose inner diameter is substantially the same as the diameter of the gate passage. The flange segments are arranged to urge the seating rings against the gate and are independently yieldable to enable the rings to conform to the shape of the periphery of the gate. Each seating ring includes an annular groove on its back side located radially outwardly of the flange segments. Each flange includes an annular ridge received in the groove and forming a fluid seal between the housing and the seating rings. A handle is provided which can be snapped onto the stem. A cap is thereafter inserted into the handle to prevent accidental removal of the handle.

14 Claims, 9 Drawing Figures

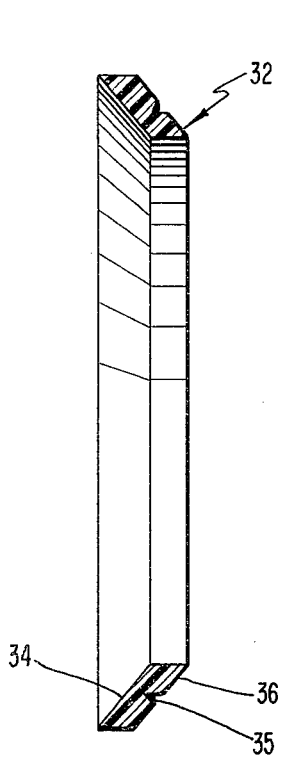
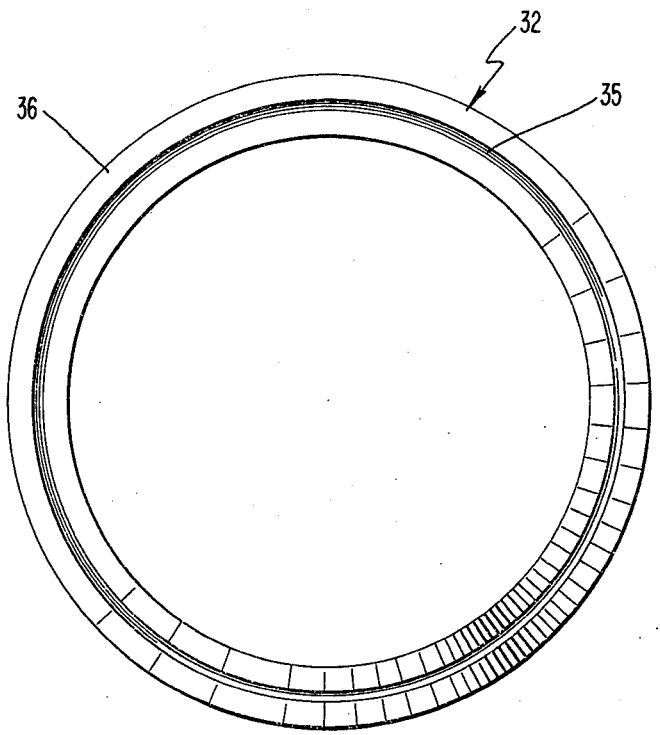
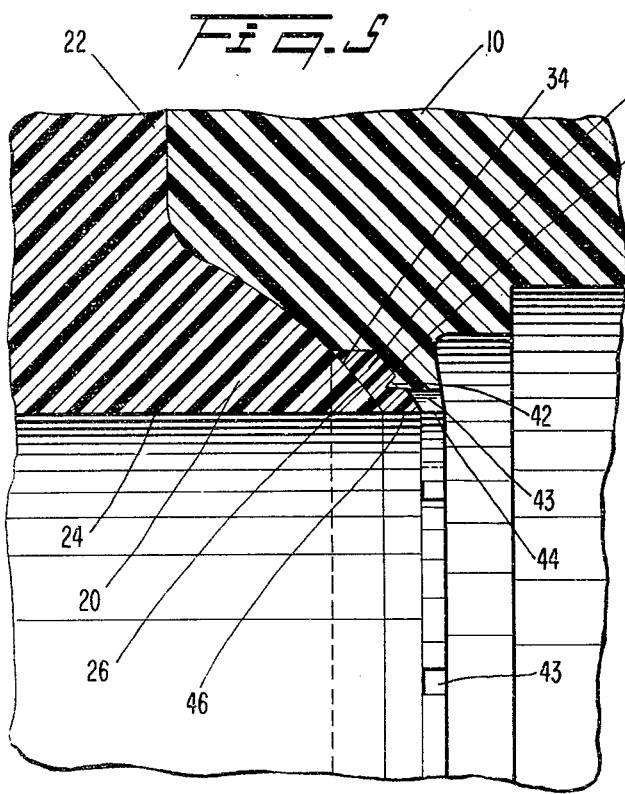
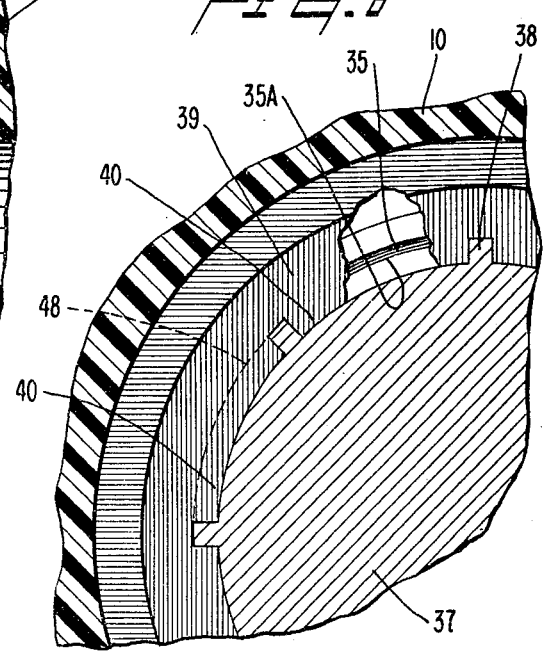

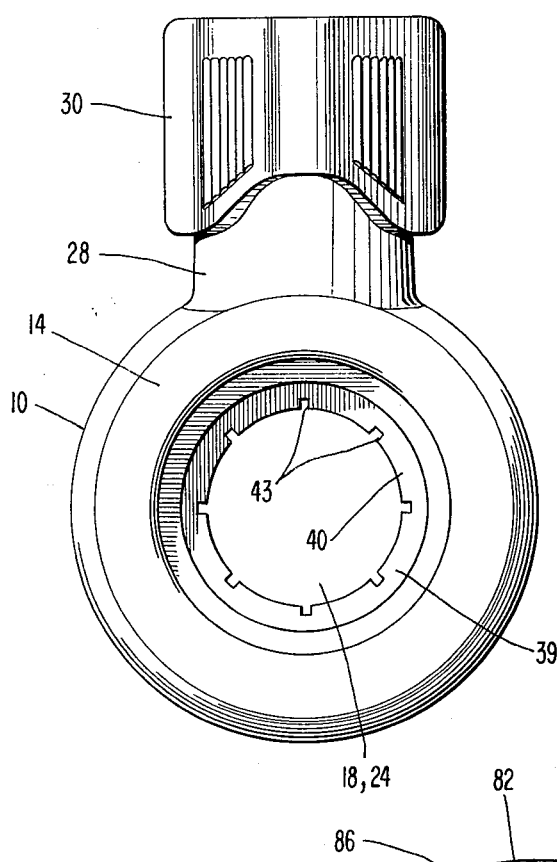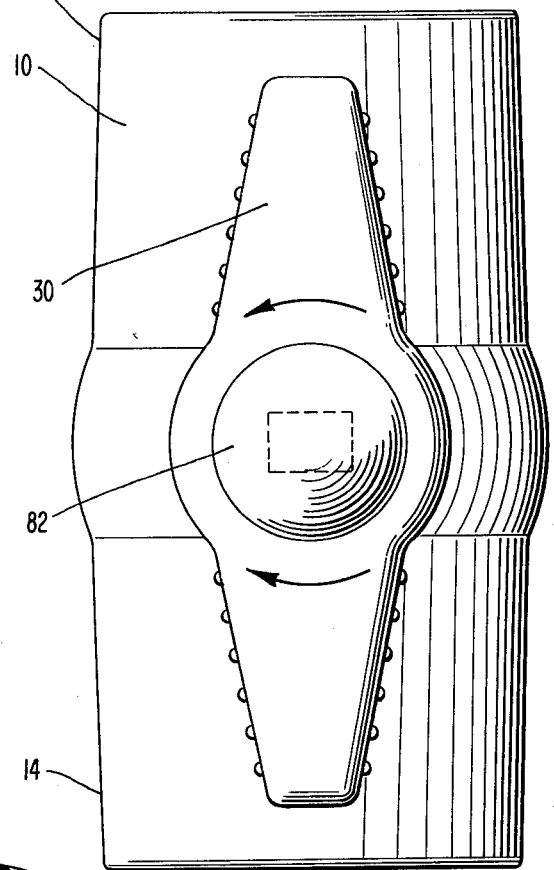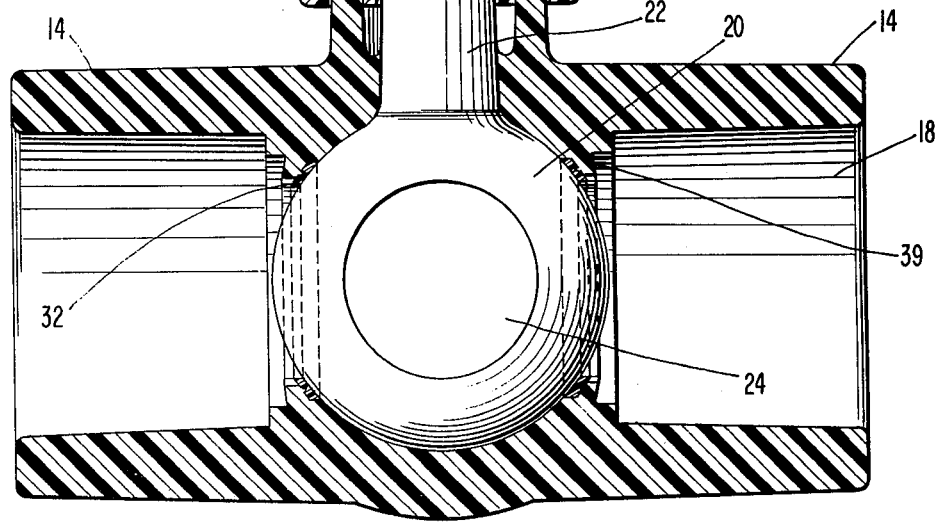

ROTARY BALL VALVE HAVING SEATING RINGS

BACKGROUND AND OBJECTS OF THE INVENTION

This invention relates to rotary plug valves and, more particularly, to a molded-in-place valve having a seating ring between the rotary plug and the valve housing.

Rotary plug valves, especially those molded from plastic materials, have received wide acceptance in many types of liquid flow control applications. Among the numerous advantages of forming such valves of plastic materials are reduced fabrication costs and immunity of the valve to damage by many corrosive fluids. Examples of previously proposed plastic plug valves are described in U.S. Pat. No. 3,271,845 issued to Breher on Sept. 13, 1966, U.S. Pat. No. 3,807,692 issued to Usab et al on Apr. 30, 1974, U.S. Pat. No. 3,907,959 issued to Wise et al on Sept. 23, 1975, and U.S. Pat. No. 3,961,770 issued to Wrasman on June 8, 1976 and assigned to the assignee of this invention.

It has heretofore been proposed to fabricate rotary plug valves by a series of steps wherein a plastic plug, such as a ball, is initially molded and then is placed in the cavity of a mold which defines the valve housing. The housing is then molded-in-place around the plug to form a unitary plug-housing assembly. In either of its open and closed positions, the plug makes contact with an opposing sealing surface which may comprise a portion of the valve housing, or a seating ring disposed between the plug and the housing.

The valve described in the above-referenced Wrasman patent is of the type in which the plug engages a portion of the housing. While that valve performs satisfactorily in most systems, there are occasions in which the plug may tend to swell under the influence of certain fluids being conducted. As a result, the plug bears tightly against the sealing face and becomes difficult to turn. In those instances, it would be advantageous to utilize a seating ring disposed between the plug and housing and formed of low-friction material, to reduce turning torque. However, the use of seating rings presents certain problems, such as the danger of leakage between the seating ring and the housing, deformation or cold flow of the seating ring due to its inherent softness, and the possibility that turning of a swollen plug may still be difficult as the seating ring is compressed between the rigid housing and the plug.

It would be advantageous to provide a plastic rotary plug which avoids such problems while creating an effective fluid seal between the seating ring and the plug on the one hand and between the seating ring and the housing on the other hand.

It would also be desirable to enable a manual turning knob to be installed on the stem portion of the plug easily and quickly without the need for separate fasteners such as screws.

It is, therefore, an object of the present invention to provide a novel plug valve which minimizes problems of the sort discussed above.

It is another object of the invention to provide a novel rotary plastic plug valve which utilizes a seating ring to obtain an effective seal.

It is another object of the invention to provide a novel rotary plug valve which resists leakage and prevents excessive deformation of the seating ring.

It is still a further object of the invention to provide a novel rotary plug valve which is easily actuated despite swelling of the plug.

It is another object of the invention to provide a novel snap-on coupling for installing a manual turning handle on the stem of a rotary plug without requiring separate fasteners.

BRIEF SUMMARY OF THE INVENTION

These objects are achieved by the present invention in which a plug valve comprises a housing having a fluid passage, a plug, and a pair of seating rings. The plug is rotatably mounted in the housing and includes a gate located within the housing passage and has a passage which is communicable with the housing passage to conduct fluid when the valve is open. The seating rings are mounted in the housing and are formed of anti-friction material. The rings are arranged on opposite sides of the gate such that front sides of the rings contact the gate and encircle respective ends of the gate passage in the valve-open position. The housing includes support means supporting each seating ring. Each support means comprises a plurality of flange segments arranged in circumferentially spaced relation around the housing passage in contacting relation with the back side of an associated seating ring to urge the associated seating ring against the gate, the segments being individually yieldable to enable the seating rings to conform to the shape of the gate.

THE DRAWING

These and other objects and advantages of the invention will become apparent from the following detailed description of a preferred embodiment thereof in connection with the accompanying drawings in which like numerals designate like elements, and in which:

FIG. 3 is a longitudinal sectional view through a seating ring according to the present invention;

FIG. 4 is a rear view of the seating ring;

FIG. 5 is an enlarged fragmentary view, in longitudinal section, depicting a seating ring in contact with the plug;

FIG. 6 is a fragmentary cross-sectional view through the valve before the core is removed, with a portion of the housing flange broken away to expose the back side of a seating ring;

FIG. 7 is an end view of the valve;

FIG. 8 is a plan view of the valve; and

FIG. 9 is a longitudinal sectional view through the valve in a closed position.

DETAILED DESCRIPTION OF A PREFERRED EMBODIMENT OF THE INVENTION

Figure 1:
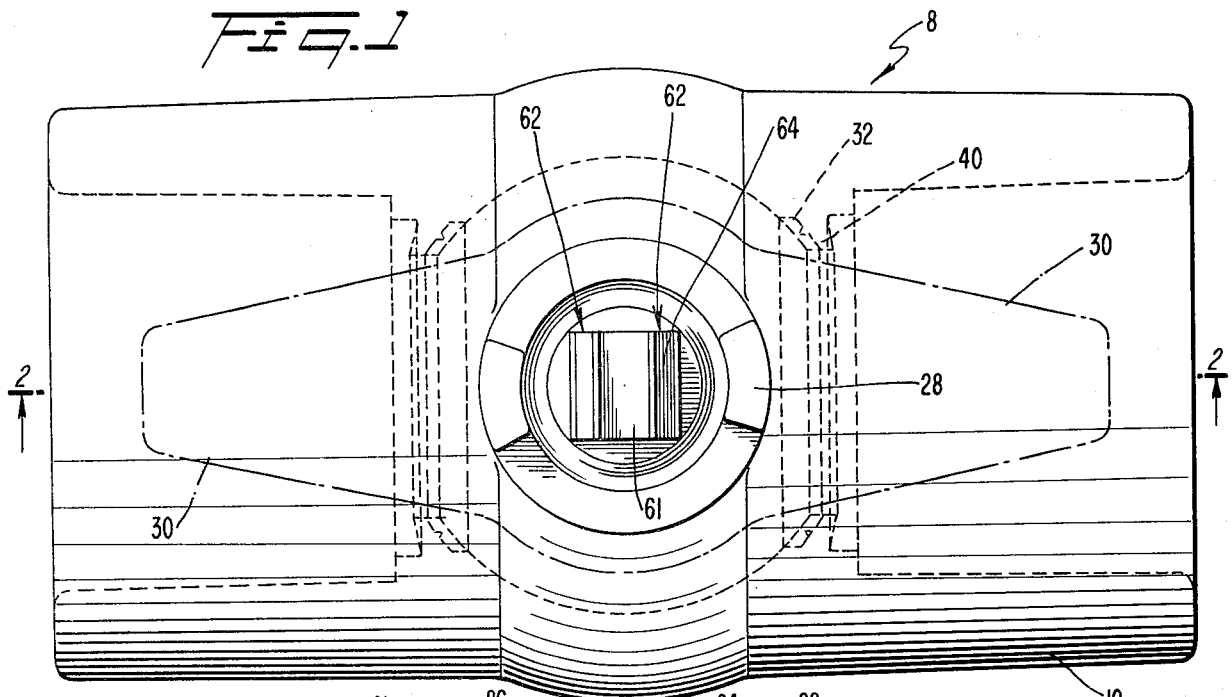
FIG. 1 is a plan view of a rotary plug valve according to the present invention in the open position, with a handle shown in phantom.

A preferred rotary plug valve 8 according to the present invention comprises a housing 10 (FIGS. 1 and 2) and a rotary plug 12 mounted for rotation within the housing 10. The housing 10 includes a pair of cylindrical end sections 14 which serve for connecting the valve to pipe conduits (not shown) in any conventional manner. For example, the end sections 14 may include internal or external screw threads for that purpose. Alternately, the end sections can be welded, flanged, or otherwise connected to the pipe conduits.

A passage 18 extends through the housing for conducting fluid, the passage being defined by annular walls 19 and an intermediate section 21.

Figure 2:
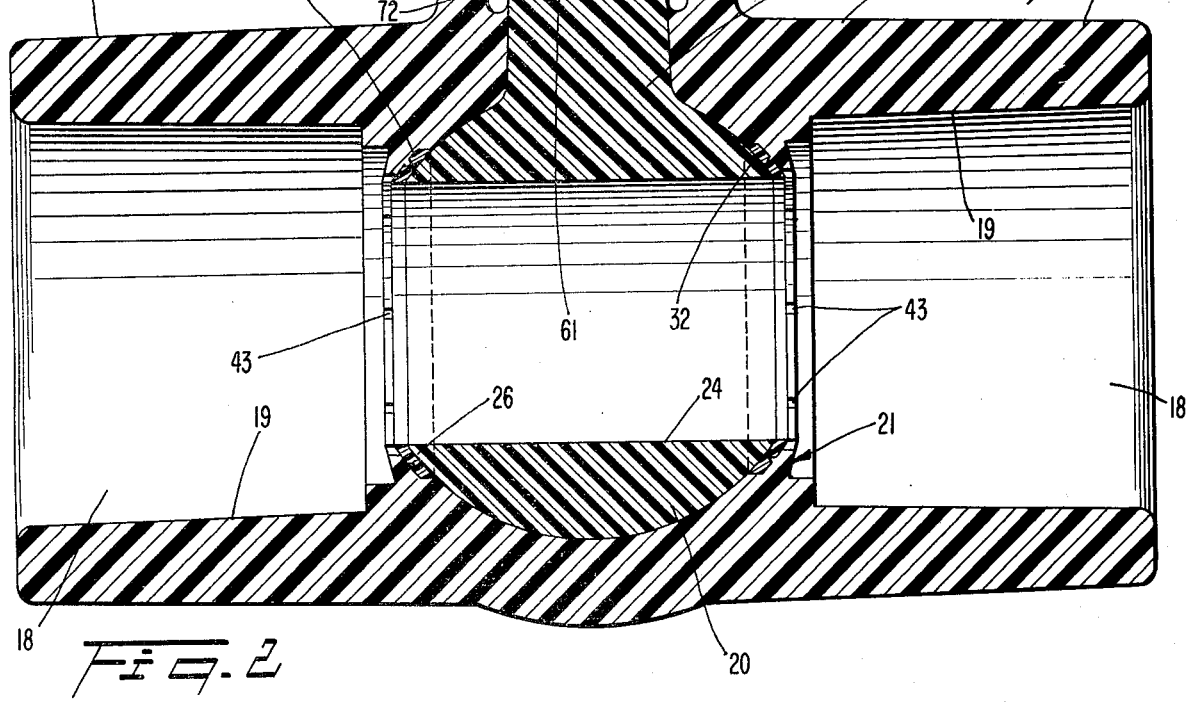
FIG. 2 is a longitudinal sectional view through the valve taken along line 2—2 in FIG. 1.

The plug 12 comprises a gate in the form of a generally spherical ball portion 20 and a stem portion 22 projecting outwardly therefrom. A passage 24 extends through the ball and is aligned with the housing passage 18 when the valve is in an open condition (FIG. 2).

The ball 20 is preferably formed in accordance with principles disclosed in U.S. Pat. No. 3,961,770 issued to Wrasman on June 8, 1976 and assigned to the assignee of the present invention. The disclosure of that patent is incorporated herein by reference as if set forth at length.

In particular, the plug is molded of a thermoplastic material, preferably a polymer, such as chlorinated PVC for example. The housing 10 is also preferably formed of a polymer, such as PVC. The ball is formed such that regions 26 on the ball periphery immediately surrounding the ends of the ball passage 24 are free of mold parting lines and are recessed slightly inwardly relative to the surrounding peripheral portions of the ball, preferably by having a slightly smaller diameter than such surrounding portions, as disclosed in the afore-mentioned Wrasman patent. The housing 10 is formed around the ball 26 by positioning the ball within a mold cavity which defines the housing shape, and injecting liquified PVC into the cavity.

In the finished valve the stem 22 projects laterally of the passage 18 through the housing 10. A cylindrical extension 28 of the housing surrounds the stem and is spaced outwardly thereof in a direction radially of the axis of rotation of the plug. A handle 30 is mounted on the stem 22 in a manner to be subsequently discussed, to enable the plug to be manually rotated.

Mounted in the housing 10 are a pair of seating rings 32 (FIGS. 3 and 5) which are formed of a soft anti-friction material such as poly(tetrafluoroethylene). Each seating ring 32 includes a front side 34 which contacts the outer periphery of the ball 12, and a back side 36 which is embedded within the housing 10. An annular groove 35 is disposed on the back side 36. The seating rings are located on opposite sides of the ball at opposite ends of the passage 24 to contact the ball and encircle the ends of the ball passage when the valve is in an open position (FIG. 2). In a non-installed condition (FIGS. 3 and 4) the ring 32 is of generally frusto-conical shape, with the front and back sides 34, 36 being flat. When the ring 32 is embedded within the valve, the front and back sides assume a curvalinear shape corresponding to the shape of the ball. Due to the softness of the anti-friction material of which the seating rings are formed, the rings will be immediately subjected to the effects of creep and cold flow and will assume the curvalinear shape. The seating rings extend into the fluid passage 18 in a generally radial direction. Actually, such direction has axial as well as radial components. The expression "generally radial direction" is intended to include a direction having both such components.

Encasement of the seating rings 32 within the valve is performed when the housing is formed around the plug, i.e., the seating rings 32 are positioned against the ball 12 at the end of the passage 24 and non-solidified housing material is applied therearound. After the housing material hardens, the seating rings are securely and permanently arranged in contact with the ball.

More specifically, the ball is seated within a mold cavity shaped in the form of the valve housing. The ball is seated on cores 37 which extend into opposite ends of the ball passage 24, one of such cores 37 being depicted in cross-section in FIG. 6. The seating rings 32 are mounted on the cores with the front side 34 thereof abutting the outer periphery of the ball. The cores include generally outwardly projecting fingers 38 which contact the back sides 36 of the seating rings and press the latter tightly against the ball. The fingers 38 extend no further than the inner edge 35A of the groove 35 of the seating ring 32. Liquified material, such as PVC is introduced, as by injection molding, into the mold cavity to form the housing 10. The PVC material forms a flange 39 which encases the back side 36 of the seating rings. Portions 40 of the flange 39 located between the fingers 38 define a plurality of circumferentially spaced flange segments 40 which bear against the back sides of the seating rings 32. When the cores 37 are removed, withdrawal of the fingers 38 leaves notches 43 (FIG. 7) separating the flange segments 40.

The PVC material also occupies the annular groove 35 of each seating ring to form an annular ridge 42 of the housing (FIG. 5). This ridge groove arrangement forms an interlock for the ring within the housing, as well as a fluid seal preventing the leakage of fluid between the housing 10 and the back side 36 of the seating rings. The notches 43 extend radially outwardly only part-way to the outer end of the flange 39, i.e., the notches do not extend radially beyond the ridge-groove interlock.

The flange segments 40 project generally radially into the housing passage 18 to the same extent as the associated seating ring 32. That is, inner edges 44 of the flange segments 40 are essentially flush with an inner edge 46 of the associated seating ring (FIG. 5). Thus, the flange segments 40 and the seating rings 32 have essentially the same internal diameters so that no appreciable portions of the rings 32 extend radially inwardly beyond the flange segments 40. Hence, the entire radial extent of each ring is supported by the flange segments to prevent deformation thereof. It will be appreciated that since the seating rings are formed of a relatively soft material, the occurrence of substantial deformation of the rings, especially at their radially inner ends, would be possible in the absence of such radial support. Such deformation of the seating rings could lead to leakage.

The flange segments 40 are arranged to urge the seating rings firmly against the ball surface to effect a fluid seal therebetween. The flange segments are somewhat individually yieldable about a pivot axis defined by an imaginary line of joinder 48 (FIG. 6) between such segments and the remainder of the flange 39. Thus, the flange segments 40 can yield independently of one another in any required pattern to enable the seating rings to conform to the shape of the ball. As a result, the need for precision dimensioning of the ball is eliminated, i.e., the seating rings 32 can adapt to out-of-roundless of the ball to minimize turning torque. The flange segments can yield without the occurrence of appreciable fatigue stress which could otherwise reduce the lifespan of the valve.

As noted earlier, the outer diameter of the ball is slightly smaller in the regions 26 immediately surrounding the ends of the ball passage 24. As a result, when the ball is rotated from an open to a closed position, the seating rings 32 are contacted by portions of the ball of larger diameter, thereby increasing the pressure between the ball and the seating rings. Thus, the seating rings are pressed more tightly against the supporting flanges 39 and flange segments 40. Accordingly, the ridge 42 presses tightly against the walls of the groove 35 to intensify the sealing action between the seating ring and the housing. This aids in alleviating problems heretofore encountered involving leakage between the seating ring and housing in the valve-closed position. Additional sealing action will be produced in the closed position of the valve as the result of the upstream flange being pressurized by fluid in the conduit. Such fluid pressure tends to urge the seating rings more firmly against the ball, and to urge the ridges 42 more tightly against the walls of the grooves 35.

The flange segments 40 can be formed of any suitable thickness and length, depending upon the degree of flexibility which is desired.

Another important feature of the valve relates to the snap-on mounting of the handle 30 on the stem 22. The stem includes a pair of spaced apart arms 60 which form a noncircular recess 61 therebetween. At their outermost or terminal ends, the arms include laterally extending ears 62 each having an inclined outer surface 64.

The handle 30 includes an annular skirt portion 68 which fits into an annular recess 70 formed between the stem 22 and the cylindrical extension 28. Mating shoulders 72, 74 on the stem and skirt limit the downward travel of the handle on the stem. The skirt includes a pair of flat surfaces 76 which are adapted to engage opposing surfaces 77 of the stem 22 to transmit rotation from the handle to the stem. Shoulders 78 are provided on the skirt which shoulders are adapted to contact the inclined faces 64 on the arms 60 to flex the arms 60 together as the handle is being installed on the stem. Thereafter, the arms 60 spring out so that the ears 62 overlie an abutment face 80 which forms the floor of a circular cavity 81 in the handle. Accordingly, removal of the handle is prevented.

In order to insure against unintentional removal of the handle 30, a cap 82 is provided which includes a head 84 and a depending tongue 86. The tongue 86 is dimensioned to fit into the recess 61 between the arms 60 to prevent the arms from flexing toward one another. The head portion 84 occupies the cavity 81. The cap is retained in position by means of ridges 88 on the tongue 86 which are received in corresponding pockets in the arms 60.

By virtue of the snap-on characteristic of the handle 30, the valve can be assembled in a more expedient fashion since no time-consuming attachment of separate fasteners, such as screws, is required.

SUMMARY OF MAJOR ADVANTAGES OF THE INVENTION

By virtue of the present invention, separate seating rings may be effectively employed in a rotary ball valve. Ample support for the seating rings is achieved by the flange and flange segments to prevent excessive deformation thereof. At the same time the flange segments are individually yieldable to enable the seating rings to conform to any unevenness in the ball periphery, thereby minimizing turning torque without creating appreciable fatigue stresses in the flange.

Leakage between the valve housing and the seating rings is minimized by the interaction between the ridge-groove interlock between the housing and seating rings.

The snap-on handle arrangement permits rapid and convenient installation of the handle without the need for separate threaded fasteners.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. A plug valve comprising:
   A housing having a fluid passage,
   a plug rotatably mounted in the housing and including a gate located within said housing passage and having a passage which is communicable with said housing passage to conduct fluid when the valve is open, and
   a pair of seating rings mounted in said housing, said seating rings formed of anti-friction material and arranged on opposite sides of said gate such that front sides of said rings contact said gate and encircle respective ends of said gate passage in the valve-open position,
   said housing including support means supporting each seating ring, each support means comprising a plurality of flange segments separated by open spaces arranged in circumferentially spaced relation around said housing passage in contacting relation with the back side of an associated seating ring to urge the associated seating ring against said gate,
   said flange segments projecting generally radially inwardly to an inner diameter of said seating ring and being individually yieldable to enable said seating rings to conform to the shape of said gate.

2. A valve according to claim 1 wherein each seating ring includes an annular groove on the back side thereof, each flange including an annular ridge received in said groove and forming a fluid seal between said housing and said seating rings.

3. A valve according to claim 2, wherein said annular groove and ridge are each V-shaped in cross-section.

4. A valve according to claim 2, wherein each groove is located radially outwardly of said flange segments.

5. A valve according to claim 1, wherein said plug includes a stem connected to said gate, said stem comprising a pair of spaced arms forming a recess therebetween, each arm having a laterally extending ear at the terminal end thereof; a handle for turning said stem comprising a pair of laterally spaced surfaces for contacting outer faces of said stem to transmit rotary motion thereto, said handle including shoulders for flexing said arms inwardly toward one another as the handle is inserted onto said stem to enable said surfaces to travel past said ears, whereupon said arms snap outwardly to position each ear in overlying relation to an abutment face of said handle to prevent removal of the latter; and a cap including a tongue insertable into said recess between said arms to prevent said arms from flexing toward one another after said handle has been installed.

6. A valve according to claim 1, wherein said plug includes a stem connected to said gate, said stem comprising a pair of spaced arms forming a recess therebetween, each arm having a laterally extending ear at the terminal end thereof; a handle for turning said stem comprising a pair of laterally spaced surfaces for contacting outer faces of said stem to transmit rotary motion thereto, said handle including shoulders for flexing said arms inwardly toward one another as the handle is inserted onto said stem to enable said surfaces to travel past said ears, whereupon said arms snap outwardly to position each ear in overlying relation to an abutment face of said handle to prevent removal of the latter; and a cap including a tongue insertable into said recess between said arms to prevent said arms from flexing toward one another after said handle has been installed.

7. A valve according to claim 1 wherein said housing is formed of a plastic material.

8. A valve according to claim 7 wherein said plug is formed of a plastic material.

9. A valve according to claim 1 wherein said seating rings are formed of poly(tetrafluoroethylene).

10. In a rotary valve of the type comprising a housing having a passage and a plug including a gate rotatably mounted in said housing passage and including a passage which can be aligned with said housing passage, said plug including a stem, and a handle mounted on said stem, the improvement wherein:

said stem includes a pair of spaced arms forming a recess therebetween, each arm having a laterally extending ear at the terminal end thereof, said handle including
a pair of laterally spaced surfaces for contacting outer faces of said stem to transmit rotary motion to the plug, and
shoulders for flexing said arms inwardly toward one another when the handle is inserted onto said stem to enable said surfaces to travel past said ears whereupon said arms position each ear in overlying relation to an abutment face of said handle to prevent removal of the latter;

a cap including a tongue insertable into said recess between said arms to prevent said arms from flexing toward one another after said handle has been installed.

11. Apparatus according to claim 10, wherein said arms each include a pocket facing said recess, said tongue including ridges arranged for reception in said pockets to resist removal of said cap.

12. Apparatus according to claim 10, wherein said ears include inclined outer faces which are cammed inwardly by said shoulders of said handle.

13. Apparatus according to claim 10, wherein said handle includes a cavity having a floor defining said abutment face, said ears overlying said floor to prevent withdrawal of said handle, said cap including a head portion occupying said cavity.

14. Apparatus according to claim 10, wherein said handle includes additional shoulder means engageable with a surface on said stem to limit the extent of insertion of said handle onto said stem.

* * * * *